United States Patent
Yamakawa et al.

(10) Patent No.: US 10,164,551 B2
(45) Date of Patent: *Dec. 25, 2018

(54) BOOST CONTROL APPARATUS BASED ON OUTPUT CURRENT CHANGE RATE

(71) Applicant: TOYOTA JIDOSHA KABUSHIKI KAISHA, Toyota-shi, Aichi-ken (JP)

(72) Inventors: Toshifumi Yamakawa, Shizuoka-ken (JP); Masaki Okamura, Toyota (JP); Naoyoshi Takamatsu, Shizuoka-ken (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/041,415

(22) Filed: Feb. 11, 2016

(65) Prior Publication Data

US 2016/0241162 A1 Aug. 18, 2016

(30) Foreign Application Priority Data

Feb. 13, 2015 (JP) .................................. 2015-026653

(51) Int. Cl.
*H02M 1/00* (2006.01)
*H02M 3/158* (2006.01)
(Continued)

(52) U.S. Cl.
CPC ........... *H02M 7/537* (2013.01); *H02M 3/158* (2013.01); *H02M 3/1582* (2013.01);
(Continued)

(58) Field of Classification Search
CPC ... H02M 2001/0012; H02M 2001/009; H02M 2001/0058; H02M 1/42; H02M 1/14;
(Continued)

(56) References Cited

U.S. PATENT DOCUMENTS 7,800,928 B1\* 9/2010 Dernovsek ............ H02M 7/523
363/132
8,222,763 B2 7/2012 Mimatsu et al.
(Continued)

FOREIGN PATENT DOCUMENTS

CN 103368386 A 10/2013
JP 2005-151606 A 6/2005
(Continued)

OTHER PUBLICATIONS

T.-S. Hwang et al., "Seamless Boost Converter Control Under the Critical Boundary Condition for a Fuel Cell Power Conditioning System," IEEE Transactions on Power Electronics, vol. 27, No. 8, Aug. 2012.

(Continued)

*Primary Examiner* — Gustavo Rosario Benitez
(74) *Attorney, Agent, or Firm* — Hunton Andrews Kurth LLP

(57) ABSTRACT

A boost control apparatus is provided with: a controlling device configured (i) to perform first duty control by a first control parameter if output current that flows through a reactor is not near zero, and (ii) to perform second duty control by a second control parameter if the output current is near zero, during one-side element control for driving only one of a first switching element and a second switching element, each of which is connected to a reactor in series. A rate calculating device is provided that is configured to calculate a change rate of the output current to a change amount of a duty value in the first duty control and the second duty control. A control determining device is also provided that is configured to control the controlling device to perform the second duty control regardless of the output current, if the change rate is less than a predetermined value.

10 Claims, 12 Drawing Sheets

(51) Int. Cl.
*H02M 1/42* (2007.01)
*H02M 7/537* (2006.01)
*H02M 7/493* (2007.01)

(52) U.S. Cl.
CPC .... *H02M 7/493* (2013.01); *H02M 2001/0003* (2013.01); *H02M 2001/0016* (2013.01)

(58) Field of Classification Search
CPC ....... H02M 3/1582; H02M 2001/0003; H02M 3/158; H02M 3/1588; H02M 7/537; B60L 2210/14; B60L 2210/10; B60L 2210/40; B60L 2240/421; B60L 2240/423; B60L 2240/80; B60L 2260/44
See application file for complete search history.

(56) References Cited

U.S. PATENT DOCUMENTS

| | | | |
|---|---|---|---|
| 8,897,043 B2 | 11/2014 | Usami | |
| 2006/0197480 A1* | 9/2006 | Mori | H02P 6/16 318/400.04 |
| 2009/0033302 A1* | 2/2009 | Hariu | H02M 1/36 323/283 |
| 2009/0040791 A1* | 2/2009 | Qahouq | H02M 3/1588 363/21.01 |
| 2009/0085546 A1* | 4/2009 | Phadke | H02M 1/4225 323/284 |
| 2009/0243523 A1* | 10/2009 | Tanaka | B60K 6/365 318/376 |
| 2010/0202177 A1 | 8/2010 | Kajouke et al. | |
| 2011/0248663 A1 | 10/2011 | Yamakawa et al. | |
| 2012/0049774 A1* | 3/2012 | Takamatsu | B60L 11/1803 318/400.3 |
| 2012/0087159 A1* | 4/2012 | Chapman | H02J 3/383 363/41 |
| 2012/0126771 A1* | 5/2012 | Tuten | G01R 19/0053 323/284 |
| 2012/0281436 A1* | 11/2012 | Cuk | H02M 3/33569 363/21.03 |
| 2012/0327541 A1* | 12/2012 | Jung | H02H 3/46 361/62 |
| 2013/0258734 A1 | 10/2013 | Nakano et al. | |
| 2013/0311026 A1 | 11/2013 | Endo et al. | |
| 2014/0361757 A1 | 12/2014 | Sunahara | |
| 2016/0241133 A1 | 8/2016 | Yamakawa et al. | |

FOREIGN PATENT DOCUMENTS

| | | | | |
|---|---|---|---|---|
| JP | 2006254593 B2 | 9/2006 | | |
| JP | 2009-171735 A | 7/2009 | | |
| JP | 2011-120329 A | 6/2011 | | |
| JP | 2012090453 A | 5/2012 | | |
| JP | 2013-153583 A | 8/2013 | | |
| JP | WO 2013111821 A1 * | 8/2013 | .......... | H02M 3/1588 |

OTHER PUBLICATIONS

J. Morroni et al., "Adaptive Tuning of Switched-Mode Power Supplies Operating in Discontinuous and Continuous Conduction Modes," IEEE Transactions on Power Electronics, vol. 24, No. 11, Nov. 2009.
Office Action dated Feb. 17, 2017 in U.S. Appl. No. 15/041,260.
US Patent and Trademark Office, Notice of Allowance in U.S. Appl. No. 15/041,260 dated Oct. 10, 2017, 2 pages.
Roggia et al., "Comparison among Digital Current Controllers applied to Power Factor Correction Boost Converters", Energy Conversion Congress and Exposition, 2009, ECCE, IEEE, IEEE Piscataway NJ , USA, Sep. 20, 2009 (Sep. 20, 2009), pp. 2965-2971, XP031887763, DOI: 10, 1109/ECCE.2009.5316284, ISBN: 978-1-4244-2893-9.
Gusseme et al. "Digital Control of Boost PFC Converters Operating in both Continuous and Discontinuous Conduction Mode", Power Electronics Specialists Conference, 2004. PESC 04.2004 IEEE 35th Annual, Aachen, Germany Jun. 20-25, 2004, Piscataway, NJ, USA, IEEE, US, vol. 3, Jun. 20, 204 (Jun. 20, 2004), pp. 2346-2352, XP010739641, DOI: 10.1109/PESC.2004.1355488, ISBN: 978-0-7803-8399.9.
Clark et al., "Digital DCM Detection and Mixed Conduction Mode Control for Boost PFC Converters", IEEE Transactions on Power Electronics, vol. 29, No. 11 Jan. 2014 (Jan. 1, 2014), pp. 347-355, XP055246531, USA, ISSN: 0885-8993, DOI: 10.1109/TPEL.2013.2252471.
Roggia et al., "Implementation Issues of a Digital Control System Applied to a PFC Boost Converter", IECON 1009—35th Annual Conference of IEEE Industrial Electronics (IECON 2009)—Nov. 3-5, 2009—Porto, Portugal, IEEE, Piscataway, NJ, USA, Nov. 3, 2009 (Nov. 3, 2009), pp. 1519-1524, XP031629402, ISBN: 978-1-4244-4648-3.
Gusseme et al., "Sample Correction for Digitally Controlled Boost PFC Converters Operating in both CCM and DCM", APEC 2003. 18th Annual IEEE Applied Power Electronics Conference and Exposition, Miami Beach, FL, Feb. 9-13, 2003; [Annual Applied Power Electronics Conference], New York, NY: IEEE, US, Feb. 9, 2003 (Feb. 9, 2003), pp. 389-395, vol. 1, XP032155929, DOI: 10.1109/APEC.2003.1179243, ISBN: 978-0-7803-7768-4.

* cited by examiner

BOOST CONTROL APPARATUS BASED ON OUTPUT CURRENT CHANGE RATE

CROSS-REFERENCE TO RELATED APPLICATIONS

This application is based upon and claims the benefit of priority of the prior Japanese Patent Application No. 2015-026653, filed on Feb. 13, 2015, the entire contents of which are incorporated herein by reference.

BACKGROUND OF THE INVENTION

1. Field of the Invention

Embodiments of the present invention relate to a boost control apparatus mounted, for example, on a vehicle or the like.

2. Description of the Related Art

On an electric vehicle, such as an electric car, a hybrid car, and a fuel cell vehicle, an inverter is mounted in order to control a motor generator that generates driving force used for running and regenerative power used for power storage. Since electric power used by the inverter varies depending on a running state or the like, a voltage conversion apparatus (or a converter) is provided between a power storage apparatus and the inverter in some cases.

In order to improve fuel efficiency of the electric vehicle, it is effective to reduce a loss of the converter. Thus, for example, in Japanese Patent Application Laid Open No. 2011-120329, there is proposed a technology in which a boost converter is switching-driven only by a one-side element (hereinafter referred to as "one-side element control"). According to the one-side element control, it is considered that the loss of the converter can be reduced, for example, due to a reduction in current ripple.

In Japanese Patent Application Laid Open No. 2005-151606, there is proposed a technology related to control of the converter in which a moment at which current that flows through a reactor becomes nearly zero (or zero crossing) is detected.

In the one-side element control, a relation between output current and a duty ratio significantly changes before and after the zero crossing, and it is thus preferable to change control content depending on whether or not it is the zero crossing. In other words, it is preferable to switch between control for a zero-crossing region and control for a non-zero-crossing region, and to perform either one, as occasion demands.

Here, the zero crossing can be determined, for example, by monitoring the current that flows through the reactor and applied voltage or the like; however, it is not easy to detect the zero crossing with high accuracy and without delay in conventional technologies including the aforementioned patent literatures. If the timing of the zero crossing cannot be accurately detected, duty control cannot be appropriately switched, which can result in such a technical problem that desired output current cannot be obtained. In particular, it is considered that such a problem frequently occurs in a high-frequency state.

SUMMARY

In view of the aforementioned problems, it is therefore an object of embodiments of the present invention to provide a boost control apparatus configured to accurately determine the zero crossing in the one-side element control, thereby performing appropriate duty control.

The above object of embodiments of the present invention can be achieved by a boost control apparatus that can realize one-side element control for driving only one of a first switching element and a second switching element, each of which is connected to a reactor in series. The boost control apparatus includes a controlling device configured (i) to perform first duty control by a first control parameter if output current that flows through a reactor is not near zero, and (ii) to perform second duty control by a second control parameter if the output current is near zero. The boost control apparatus also includes a rate calculating device configured to calculate a change rate of the output current to a change amount of a duty value in the first duty control and the second duty control. A control determining device is also included in the boost control apparatus and is configured to control the controlling device to perform the second duty control regardless of the output current, if the change rate is less than a predetermined value.

The boost control apparatus according to embodiments of the present invention is, for example, a converter mounted on a vehicle, and is provided with the first switching element and the second switching element, each of which is connected to the reactor in series. The first switching element and the second switching element may be, for example, an insulated gate bipolar transistor (IGBT), a power metal-oxide semiconductor (MOS) transistor, a power bipolar transistor, or the like. For example, a diode is connected to each of the first switching element and the second switching element, in parallel.

In particular, the boost control apparatus according to embodiments of the present invention can realize the one-side element control for driving only one of the first switching element and the second switching element. When the one-side element control is performed, it is determined which switching element, out of the first switching element and the second switching element, is to be driven to perform the one-side element control, for example, on the basis of values of current and voltage to be outputted, or the like. More specifically, for example, if a motor generator connected to the boost control apparatus performs a regenerative operation, the one-side element control by the first switching element is selected. If the motor generator performs a power-running operation, the one-side element control by the second switching element is selected. As described above, if the one-side element control is performed, it is switched between the one-side element control by the first switching element and the one-side element control by the second switching element, as occasion demands.

During the one-side element control, a different control is performed depending on whether or not the output current that flows through the reactor is near zero. Specifically, if the output current is not near zero, the first duty control by the first control parameter is performed. On the other hand, if the output current is near zero, the second duty control by the second control parameter is performed. The "duty control" herein is control for changing a duty ratio of the first switching element or the second switching element (i.e. a ratio between an ON period and an OFF period), and the controlling device controls the duty ratio according to the value of the output current to be outputted. The "control parameter" may be the duty ratio itself, or another parameter that indirectly influences the duty ratio.

If the duty control is switched as described above, it is possible to respond to a change in the relation between the output current and the duty ratio, wherein the change occurs if the output current becomes near zero. For example, if the relation between the output current and the duty ratio changes, even though the duty ratio is the same, different output currents are outputted when the output current is near zero (hereinafter referred to as "zero crossing" as occasion demands) and when the output current is not near zero (hereinafter referred to as "non-zero crossing" as occasion demands). Thus, if the same duty control as that during non-zero crossing is performed during zero crossing, the output current possibly does not have a desired value. In contrast, if the different duty control is performed depending on whether or not the output current is near zero, appropriate output current can be obtained both during zero crossing and during non-zero crossing.

Particularly in embodiments of the present invention, as a device configured to determine whether or not the output current is near zero, the rate calculating device is provided. The rate calculating device calculates the change rate of the output current to the change amount of the duty value in the first duty control and the second duty control. In other words, the rate calculating device calculates a value indicating how much degree of output current changes if a constant amount of the duty value is changed.

According to the study by the present inventors, it is found that the change rate of the output current to the change amount of the duty value during zero crossing is less than that during non-zero crossing. In other words, it is found that the output current only slightly changes if a predetermined amount of the duty value is changed during zero crossing; however, the output current significantly changes if a predetermined amount of the duty value is changed during a non-zero crossing.

In embodiments of the present invention, the duty control to be performed is determined by the control determining device by using the aforementioned characteristic. Specifically, according to the control determining device, the controlling device is controlled to perform the second duty control (i.e. the duty control to be performed during zero crossing) regardless of the output current, if the change rate of the output current is less than the predetermined amount. The "predetermined value" herein is a threshold value for determining whether or not the output current is near zero, and an appropriate value may be set, for example, by actually measuring a change rate of the output current during zero crossing and a change rate of the output current during non-zero crossing. Moreover, the expression "regardless of the output current" is to the extent that the determination by the change rate is prioritized over the value of the output current actually detected, to determine the control. For example, even if the value of the output current detected by a current sensor or the like is not near zero, the second duty control to be performed during zero crossing is performed if the calculated change rate of the output current is less than the predetermined value.

If the duty control is determined according to the change rate of the output current, the appropriate duty control can be performed, for example, even if the value of the output current cannot be accurately detected. Particularly in the one-side element control, the output current periodically goes up and down, and it is thus hard to determine the zero crossing directly from an output value of the current sensor or the like. However, the zero crossing can be preferably determined by using the change rate of the output current. It is thus possible to switch the duty control according to the zero crossing at appropriate timing, thereby certainly obtaining the desired output current.

As explained above, according to the boost control apparatus in embodiments of the present invention, the zero crossing can be accurately determined during the one-side element control, and the appropriate duty control can be thus performed.

In one aspect of the boost control apparatus according to the present invention, wherein said control determining device controls said controlling device to perform the first duty control regardless of the output current, if the change rate is not less than the predetermined value.

According to this aspect, if the change rate of the output current is not less than the predetermined value, the first duty control is performed regardless of the output current. Thus, for example, even if the non-zero crossing cannot be determined directly from the output value of the current sensor or the like, the non-zero crossing can be determined from the change rate of the output current, and the first duty control to be performed during non-zero crossing can be performed at appropriate timing.

In another aspect of the boost control apparatus according to embodiments of the present invention, wherein said controlling device performs control for increasing continuity of the first control parameter and the second control parameter when switching between the first duty control and the second duty control.

According to this aspect, it is possible to prevent a disadvantage caused by low continuity of the first control parameter and the second control parameter when switching between the first duty control and the second duty. A process performed as the control for increasing the continuity is not particularly limited. For example, a process of adjusting a value used for feedback control or feed-forward control is exemplified. It is also preferable to increase the continuity as much as possible (i.e. the first control parameter and the second control parameter have extremely close values upon switching); however, the aforementioned effect can be properly obtained if the continuity is increased to some extent.

In the aspect in which the control for increasing the continuity of the first parameter and the second parameter is performed, wherein the first duty control and the second duty control include proportional integral control, and said controlling device adds a difference between the first control parameter and the second control parameter to an integral term in the proportional integral control, thereby increasing the continuity of the first control parameter and the second control parameter.

In this case, the difference between the first control parameter and the second control parameter upon control switching is added to the integral term in the proportional integral control. A value added to the integral term may be the difference itself, or may be a value obtained by performing some operation processing on the difference, such as multiplying the difference by a predetermined coefficient. This increases the continuity of the first control parameter and the second control parameter, and thus the disadvantage that occurs upon control switching can be preferably avoided.

In another aspect of the boost control apparatus according to embodiments of the present invention, wherein the first duty control and the second duty control include feedback control, and said controlling device switches a gain of the feedback control when switching between the first duty control and the second duty control.

According to this aspect, the gain of the feedback control is switched to an appropriate value upon control switching, and thus, the disadvantage caused by a change in responsiveness due to the control switching can be preferably avoided. When the gain is switched, it may be switched between a gain for the first duty control and a gain for the second duty control, which are set in advance, or a gain according to circumstances may be selected (or calculated), as occasion demands.

The nature, utility, and further features of this invention will be more clearly apparent from the following detailed description with reference to preferred embodiments of the invention when read in conjunction with the accompanying drawings briefly described below.

DETAILED DESCRIPTION OF THE PREFERRED EMBODIMENTS

Hereinafter, embodiments according to the present invention will be explained with reference to the drawings.

<Entire Configuration>

Figure 1:
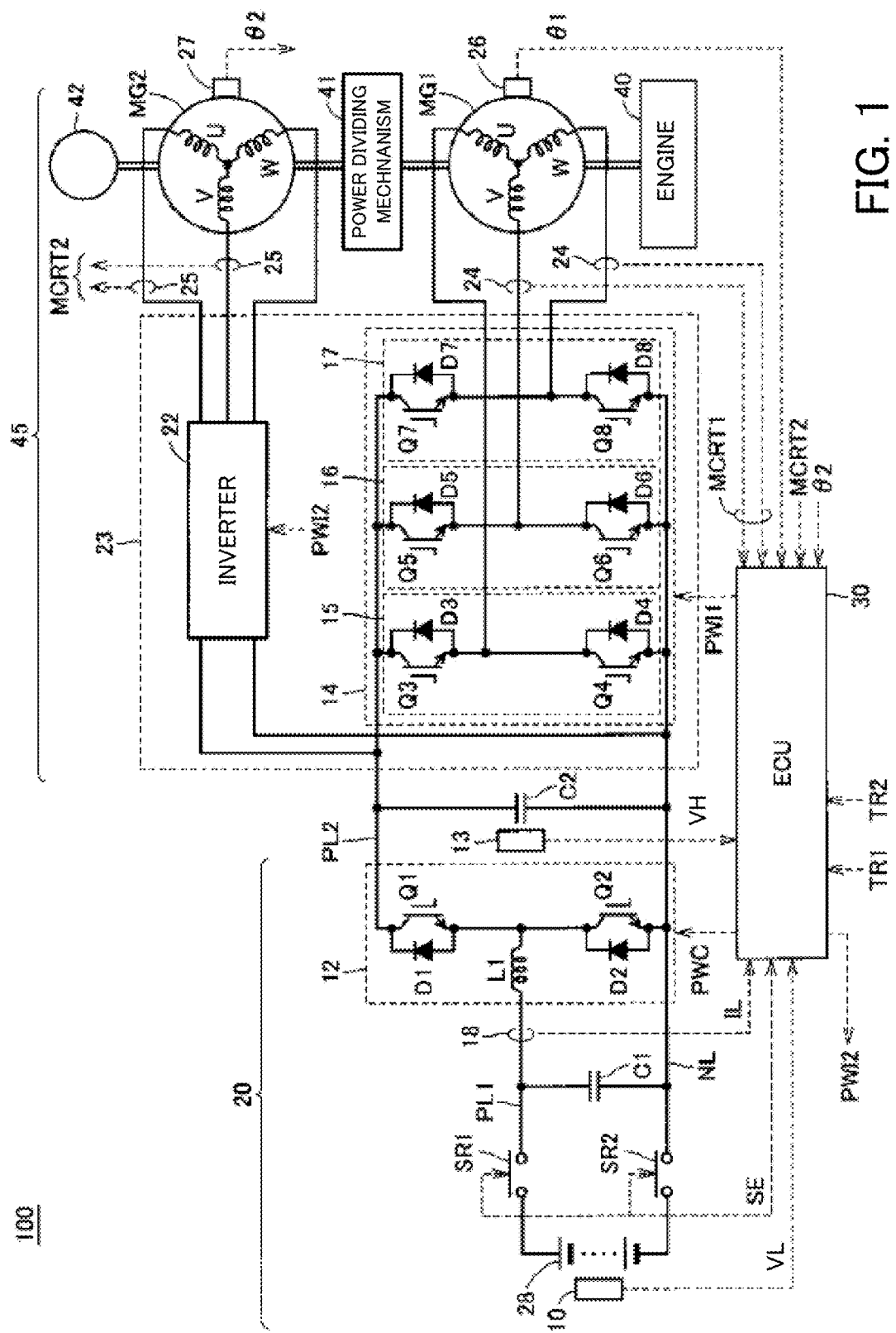
FIG. 1 is a schematic block diagram illustrating an entire configuration of a vehicle on which a boost control apparatus according to an embodiment is mounted.

Firstly, an explanation will be given to an entire configuration of a vehicle on which a boost control apparatus according to an embodiment is mounted, with reference to FIG. 1. FIG. 1 is a schematic block diagram illustrating the entire configuration of the vehicle on which the boost control apparatus according to the embodiment is mounted.

In FIG. 1, a vehicle 100 on which the boost control apparatus according to the embodiment is mounted is configured as a hybrid vehicle that uses an engine 40 and motor generators MG1 and MG2 as a power source. The configuration of the vehicle 100, however, is not limited to this example, and application can be also made to a vehicle that can run with electric power from a power storage apparatus (e.g. an electric car and a fuel-cell car) or the like. Moreover, the embodiment explains the configuration that the boost control apparatus is mounted on the vehicle 100; however, application can be also made to any device that is driven by an alternating current (AC) motor, even except for the vehicle.

The vehicle 100 is provided mainly with a direct current (DC) voltage generation unit 20, a loading apparatus 45, a smoothing capacitor C2, and an ECU 30.

The DC voltage generation unit 20 includes a power storage apparatus 28, system relays SR1 and SR2, a smoothing capacitor C1, and a converter 12.

The power storage apparatus 28 includes a secondary battery, such as, for example, a nickel hydrogen or lithium ion secondary battery, and a power storage apparatus, such as an electric double layer capacitor. Moreover, DC voltage VL outputted by the power storage apparatus 28 is detected by a voltage sensor 10. The voltage sensor 10 outputs a detection value of the DC voltage VL detected, to the ECU 30.

The system relay SR1 is connected between a positive terminal of the power storage apparatus 28 and a power line PL1, and the system relay SR2 is connected between a negative terminal of the power storage apparatus 28 and a grounding wire NL. The system relays SR1 and SR2 are controlled by a signal SE from the ECU 30, and switch between supply and cutoff of electric power from the power storage apparatus 28 to the converter 12.

The converter 12 includes a reactor L1, switching elements Q1 and Q2, and diodes D1 and D2. The switching elements Q1 and Q2 are respectively one example of the "first switching element" and the "second switching element" according to the present invention, and are connected in series between a power line PL2 and the grounding wire NL. The switching elements Q1 and Q2 are controlled by a gate signal PWC from the ECU 30.

For the switching elements Q1 and Q2, for example, an insulated gate bipolar transistor (IGBT), a power metal-oxide semiconductor (MOS) transistor, a power bipolar transistor, or the like can be used. For the switching elements Q1 and Q2, reverse parallel diodes D1 and D2 are respectively disposed. The reactor L1 is provided between a connection node of the switching elements Q1 and Q2 and the power line PL1. Moreover, the smoothing capacitor C2 is connected between the power line PL2 and the grounding wire NL.

The current sensor 18 detects reactor current that flows through the reactor L1, and outputs its detection value IL to the ECU 30. The reactor current IL is one example of the "output current" according to the present invention.

The loading apparatus 45 includes an inverter 23, the motor generators MG1 and MG2, the engine 40, a power dividing mechanism 41, and a drive wheel 42. Moreover, the inverter 23 includes an inverter 14 for driving the motor generator MG1 and an inverter 22 for driving the motor generator MG2. The provision of two pairs of the inverters and the motor generators as illustrated in FIG. 1 is not necessary. For example, either a pair of the inverter 14 and the motor generator MG1, or a pair of the inverter 22 and the motor generator MG2 may be provided.

The motor generators MG1 and MG2 generate rotational driving force for vehicle propulsion in response to AC power supplied from the inverter 23. Moreover, the motor generators MG1 and MG2 receive turning force from the exterior, generate AC power in response to a regenerative torque command from the ECU 30, and generate regenerative braking force on the vehicle 100.

Moreover, the motor generators MG1 and MG2 are also coupled with the engine 40 via the power dividing mechanism 41. Then, driving force generated by the engine 40 and the driving force generated by the motor generators MG1 and MG2 are controlled to have an optimal ratio. Moreover, one of the motor generators MG1 and MG2 may be allowed to function only as an electric motor, and the other motor generator may be allowed to function only as a generator. In the embodiment, the motor generator MG1 is allowed to function as a generator driven by the engine 40, and the motor generator MG2 is allowed to function as an electric motor that drives the drive wheel 42.

For the power dividing mechanism 41, for example, a planetary gear is used to divide the power of the engine 40 into the drive wheel 42 and the motor generator MG1.

The inverter 14 drives the motor generator MG1, for example, in order to start the engine 40, in response to boosted voltage from the converter 12. Moreover, the inverter 14 outputs, to the converter 12, regenerative power generated by the motor generator MG1 by using mechanical power transmitted from the engine 40. At this time, the converter 12 is controlled by the ECU 30 to operate as a voltage lowering circuit.

The inverter 14 is provided in parallel between the power line PL2 and the grounding wire NL, and includes U-phase upper and lower arms 15, V-phase upper and lower arms 16, and W-phase upper and lower arms 17. Each phase upper and lower arms are provided with switching elements that are connected in series between the power line PL2 and the grounding wire NL. For example, the U-phase upper and lower arms 15 are provided with switching elements Q3 and Q4. The V-phase upper and lower arms 16 are provided with switching elements Q5 and Q6. The W-phase upper and lower arms 17 are provided with switching elements Q7 and Q8. Moreover, reverse parallel diodes D3 to D8 are respectively connected to the switching element Q3 to Q8. The switching element Q3 to Q8 are controlled by a gate signal PWI from the ECU 30.

For example, the motor generator MG1 is a three-phase permanent magnet type synchronous motor, and respective one ends of three coils in U, V, and W phases are commonly connected to a neutral point. The other ends of respective phase coils are respectively connected to connection nodes of the switching elements of respective phase upper and lower arms 15 to 17.

The inverter 22 is connected in parallel with the inverter 14, with respect to the converter 12.

The inverter 22 converts DC voltage outputted by the converter 12 to three-phase alternating current and outputs it to the motor generator MG2 that drives the drive wheel 42. The inverter 22 outputs regenerative power generated by the motor generator MG2 to the converter 12 in association with regenerative braking. At this time, the converter 12 is controlled by the ECU 30 to operate as a voltage lowering circuit. An inner configuration of the inverter 22 is not illustrated but is the same as that of the inverter 14, and thus, a detailed explanation will be omitted.

The converter 12 is basically controlled in such a manner that the switching elements Q1 and Q2 are complementarily and alternately turned on and off within each switching period. The converter 12 boosts the DC voltage VL supplied from the power storage apparatus 28, to DC voltage VH, during a voltage boosting operation (wherein this DC voltage corresponding to input voltage inputted to inverter 14 is also referred to as "system voltage" hereinafter). The voltage boosting operation is performed by supplying electromagnetic energy stored in the reactor L1 in an ON period of the switching Q2, to the power line PL2 via the switching element Q1 and the reverse parallel diode D1.

Moreover, the converter 12 lowers the DC voltage VH to the DC voltage VL during a voltage lowering operation. The voltage lowering operation is performed by supplying electromagnetic energy stored in the reactor L1 in an ON period of the switching Q1, to the grounding wire NL via the switching element Q2 and the reverse parallel diode D2.

A voltage conversion ratio (or a ratio between VH and VL) in the voltage boosting operation and the voltage lowering operation is controlled by an ON period ratio (or a duty ratio) between the switching elements Q1 and Q2 in the switching period described above. If the switching elements Q1 and Q2 are respectively fixed to ON and OFF, VH=VL (voltage conversion ratio=1.0) can be also set.

The smoothing capacitor C2 smoothes the DC voltage from the converter, and supplies the smoothed DC voltage to the inverter 23. A voltage sensor 13 detects voltage between both ends of the smoothing capacitor C2, i.e. the system voltage VH, and outputs its detection value to the ECU 30.

If a torque command value of the motor generator MG1 is positive (TR1>0), the inverter 14 drives the motor generator MG1 to convert DC voltage to AC voltage and to output positive torque by a switching operation of the switching elements Q3 to Q8 that responds to a gate signal PWI1 from the ECU 30, when the DC voltage is supplied from the smoothing capacitor C2. Moreover, if the torque command value of the motor generator MG1 is zero (TR1=0), the inverter 14 drives the motor generator MG1 to convert DC voltage to AC voltage and to allow zero torque by the switching operation that responds to the gate signal PWI1. By this, the motor generator MG1 is driven to generate the zero or positive torque designated by the torque command value TR1.

Moreover, during the regenerative braking of the vehicle 100, the torque command value TR1 of the motor generator MG1 is set to be negative (TR1<0). In this case, the inverter 14 converts AC voltage generated by the motor generator MG1 to DC voltage by the switching operation that responds to the gate signal PWI1, and supplies the converted DC voltage (or system voltage) to the converter 12 via the smoothing capacitor C2. The regenerative braking herein includes braking with power regeneration when a foot brake operation is performed by a driver that drives an electric vehicle, and reducing the vehicle (or stopping acceleration) while performing the power regeneration by stepping off an accelerator pedal during running even though the foot brake operation is not performed.

In the same manner, the inverter 22 drives the motor generator MG2 to convert DC voltage to AC voltage and to allow predetermined torque by a switching operation that responds to a gate signal PWI2 received from the ECU 30 corresponding to a torque command value of the motor generator MG2.

Current sensors 24 and 25 respectively detect motor currents MCRT1 and MCRT2, which respectively flow through the motor generators MG1 and MG2, and output the detected motor currents to the ECU 30. Since the sum of instantaneous values of currents in the U, V, and W-phases is zero, it is sufficient to dispose the current sensors 24 and 25 so as to detect the motor currents in two phases, as illustrated in FIG. 1.

Rotation angle sensors (or resolvers) 26 and 27 respectively detect rotation angles $\theta 1$ and $\theta 2$ of the motor generators MG1 and MG2, and transmit the detected rotation angles $\theta 1$ and $\theta 2$ to the ECU 30. On the ECU 30, rotational speeds MRN1 and MRN2 and angular velocities $\omega 1$ and $\omega 2$ (rad/s) of the motor generators MG1 and MG2 can be calculated on the basis of the rotation angles $\theta 1$ and $\theta 2$. The rotation angle sensors 26 and 27 may not be provided if the rotation angles $\theta 1$ and $\theta 2$ are directly operated or calculated from motor voltage and current on the ECU 30.

The ECU 30 is one example of the "boost control apparatus" according to the present invention, includes, for example, a central processing unit (CPU), a storage apparatus or a memory, and an input/output buffer, and controls each device of the vehicle 100. The control performed by the ECU 30 is not limited to a process by software, but can be also established and processed exclusively by hardware (or by an electronic circuit). A specific configuration and operation of the ECU will be detailed later.

<One-Side Element Control>

Figure 2:
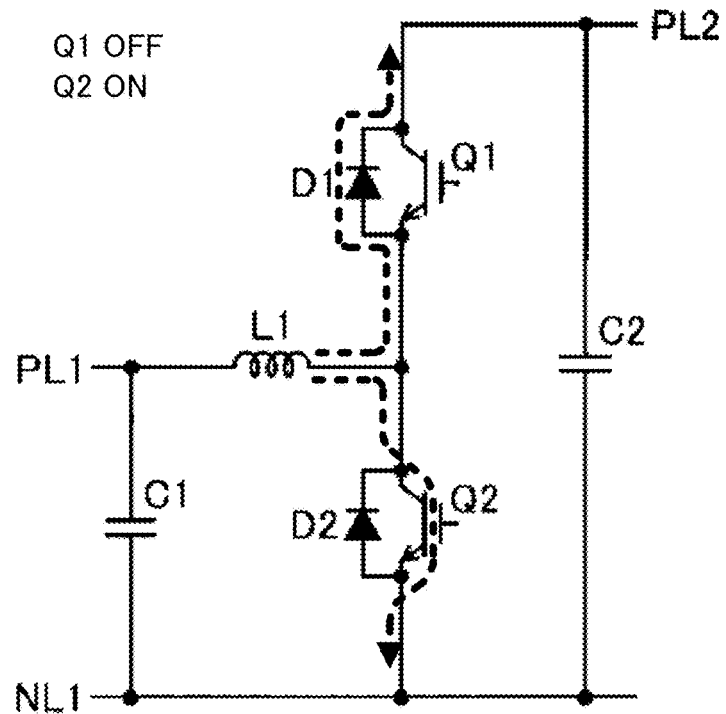
FIG. 2 is a conceptual diagram illustrating a current flow during lower-side element control.
Figure 3:
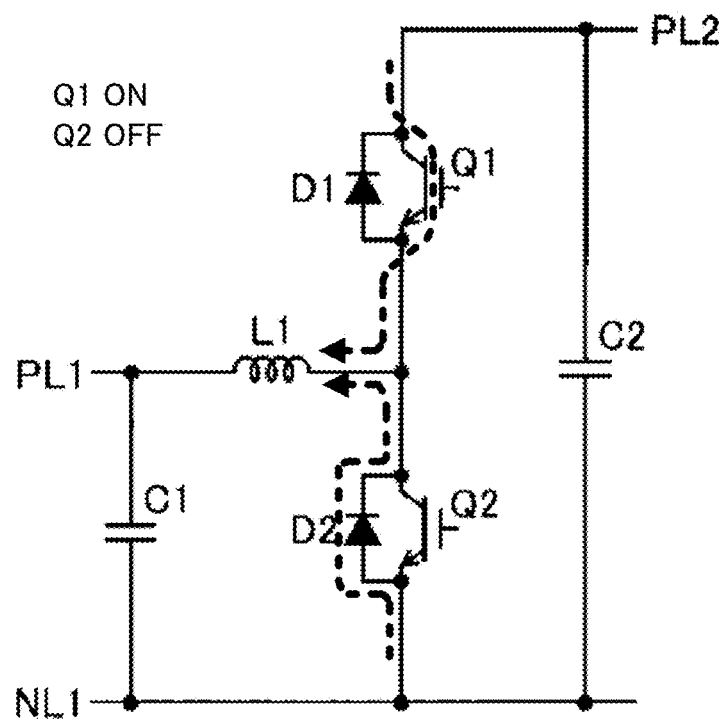
FIG. 3 is a conceptual diagram illustrating a current flow during upper-side element control.
Figure 4:
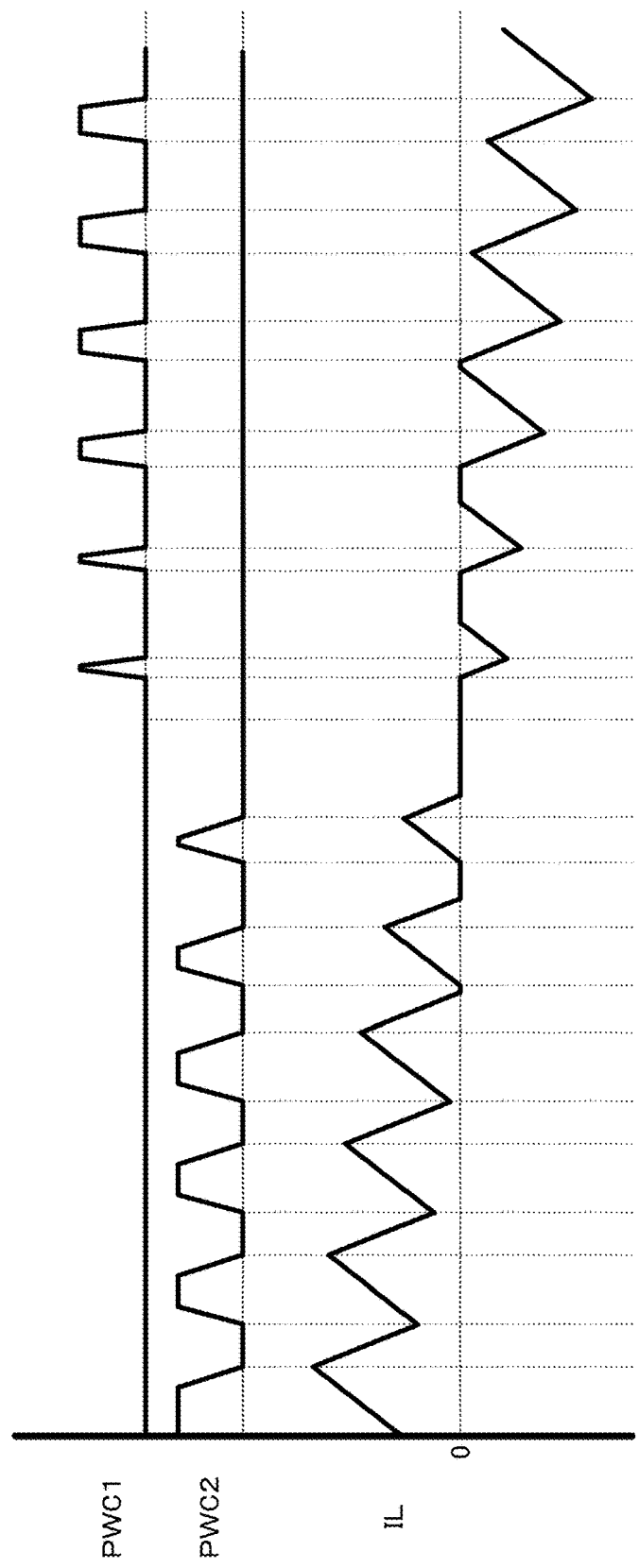
FIG. 4 is a time chart illustrating a variation in reactor current during one-side element control.

Next, one-side element control of the converter 12 will be explained with reference to FIG. 2 to FIG. 4. FIG. 2 is a conceptual diagram illustrating a current flow during lower-side element control. FIG. 3 is a conceptual diagram illustrating a current flow during upper-side element control. FIG. 4 is a time chart illustrating a variation in reactor current during one-side element control.

In FIG. 2 and FIG. 3, the converter 12 according to the embodiment can realize the one-side element control of turning on only one of the switching elements Q1 and Q2, in addition to normal control (i.e. control of turning on both the switching elements Q1 and Q2). Specifically, during power running, lower-side element control of turning on only the switching element Q2 is performed. In this case, as illustrated in FIG. 2, current that flows on the switching element Q1 side flows through the diode D1, and current that flows on the switching element Q2 side flows through the switching element Q2. On the other hand, during regeneration, upper-side element control of turning on only the switching element Q1 is performed. In this case, as illustrated in FIG. 3, current that flows on the switching element Q1 side flows through the switching element Q1, and current that flows on the switching element Q2 side flows through the diode D2.

According to the one-side element control, since either one of the switching elements Q1 and Q2 is turned on, a dead time, which is set to prevent a short-circuit in the switching elements Q1 and Q2, is not required. Thus, for example, even if high frequency is required in association with miniaturization of an apparatus, it is possible to prevent a reduction in boosting performance of the converter 12. Moreover, the one-side element control can also avoid gate interference of the switching elements and reduce a boosting loss.

As illustrated in FIG. 4, in the one-side element control, the value of the reactor current IL is controlled by selectively supplying either one of PWC1, which is a gate signal for switching between ON and OFF of the switching element Q1, and PWC2, which is a gate signal for switching between ON and OFF of the switching element Q2.

Specifically, during power running in which the lower-side element control is performed (i.e. if the reactor current IL is positive), the PWC1, which is the gate signal for switching between ON and OFF of the switching element Q1, is not supplied, and only the PWC2, which is the gate signal for switching between ON and OFF of the switching element Q2, is supplied. Moreover, during regeneration in which the upper-side element control is performed (i.e. if the reactor current IL is negative), only the PWC1, which is the gate signal for switching between ON and OFF of the switching element Q1, is supplied, and the PWC2, which is the gate signal for switching between ON and OFF of the switching element Q2, is not supplied.

<Configuration of ECU>

Figure 5:
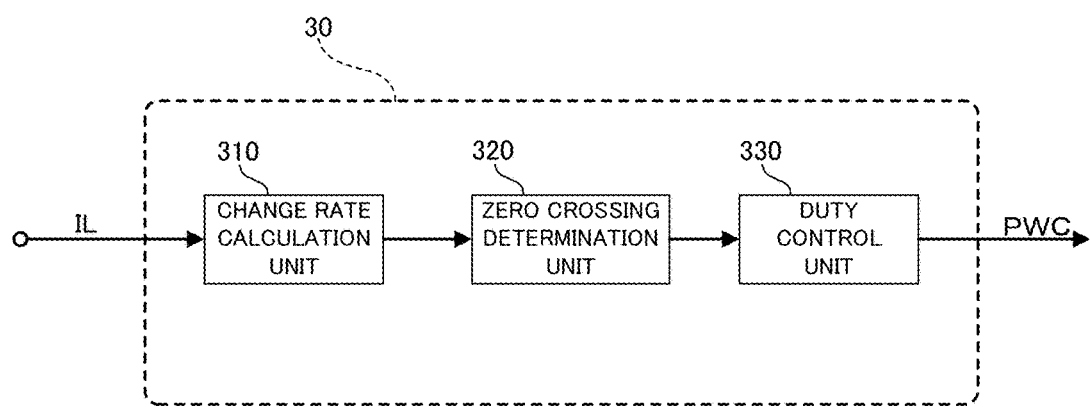
FIG. 5 is a block diagram illustrating a specific configuration of an ECU according to the embodiment.

Next, a specific configuration of the ECU 30, which is one example of the boost control apparatus according to the embodiment, will be explained with reference to FIG. 5. FIG. 5 is a block diagram illustrating the specific configuration of the ECU according to the embodiment. In FIG. 5, for convenience of explanation, out of parts of the ECU 30, only a part that is deeply related to the embodiment is illustrated, and the illustration of the other detailed parts is omitted as occasion demands.

In FIG. 5, the ECU 30 according to the embodiment is provided with a change rate calculation unit 310, a zero crossing determination unit 320, and a duty control unit 330.

The change rate calculation unit 310 is one example of the "rate calculating device" according to the present invention, and calculates a change rate of the reactor current IL to a duty change amount. In other words, the change rate calculation unit 310 calculates a value indicating how much degree of reactor current IL changes if a constant amount of duty is changed. The change rate calculated by the change rate calculation unit 310 is configured to be outputted to the zero crossing determination unit 320.

The zero crossing determination unit 320 is one example of the "control determining device" according to the present invention, and determines whether or not it is zero crossing (i.e. whether or not the reactor current IL is near zero) on the basis of the change rate calculated by the change rate calculation unit 310. The zero crossing determination unit 320 stores therein, for example, a threshold value for the change rate, and compares the change rate with the threshold value, thereby determining the zero crossing. A determination result of the zero crossing determination unit 320 is configured to be outputted to the duty control unit 330.

The duty control unit 330 is one example of the "controlling device" according to the present invention, and outputs a gate signal PWC, thereby controlling each of the ON and OFF of the switching elements Q1 and Q2. The duty control unit 330 includes, for example, a duty signal generation circuit configured to generate a duty command signal DUTY and a carrier signal generation circuit configured to generate a carrier signal CR. The duty control unit 330 compares the duty command signal DUTY generated according to a desired duty ratio, with the carrier signal CR, and outputs the gate signal PWC, which is obtained as a comparison result, to each of the switching elements Q1 and Q2.

<Problem that can Occur During Zero Crossing>

Figure 6:
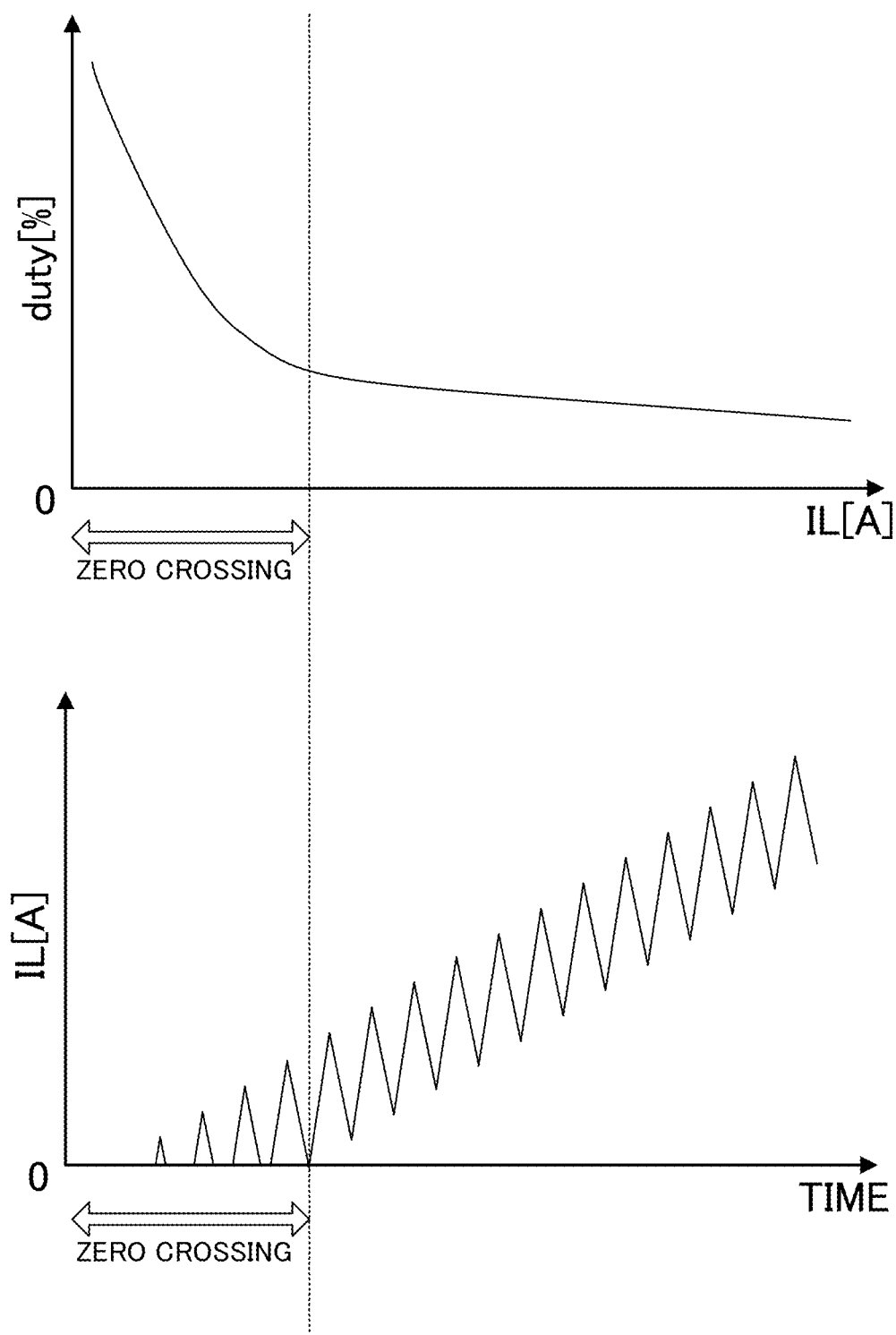
FIG. 6 is a graph illustrating a relation between duty and the reactor current during zero crossing.
Figure 7:
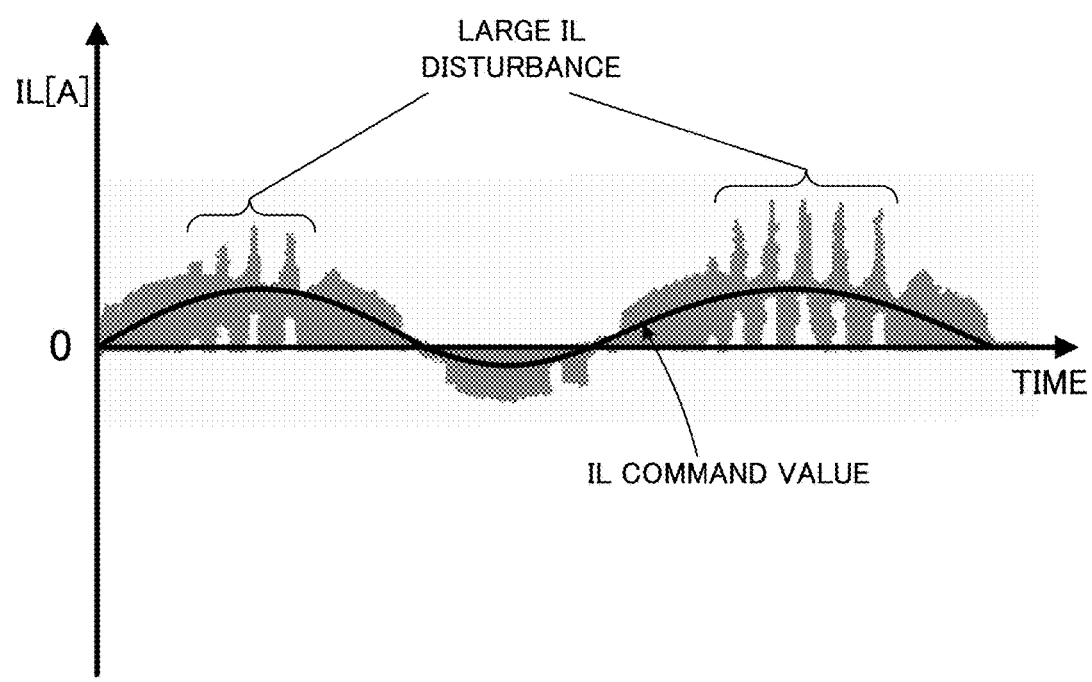
FIG. 7 is a graph illustrating a simulation result of the reactor current according to a comparative example.
Figure 8:
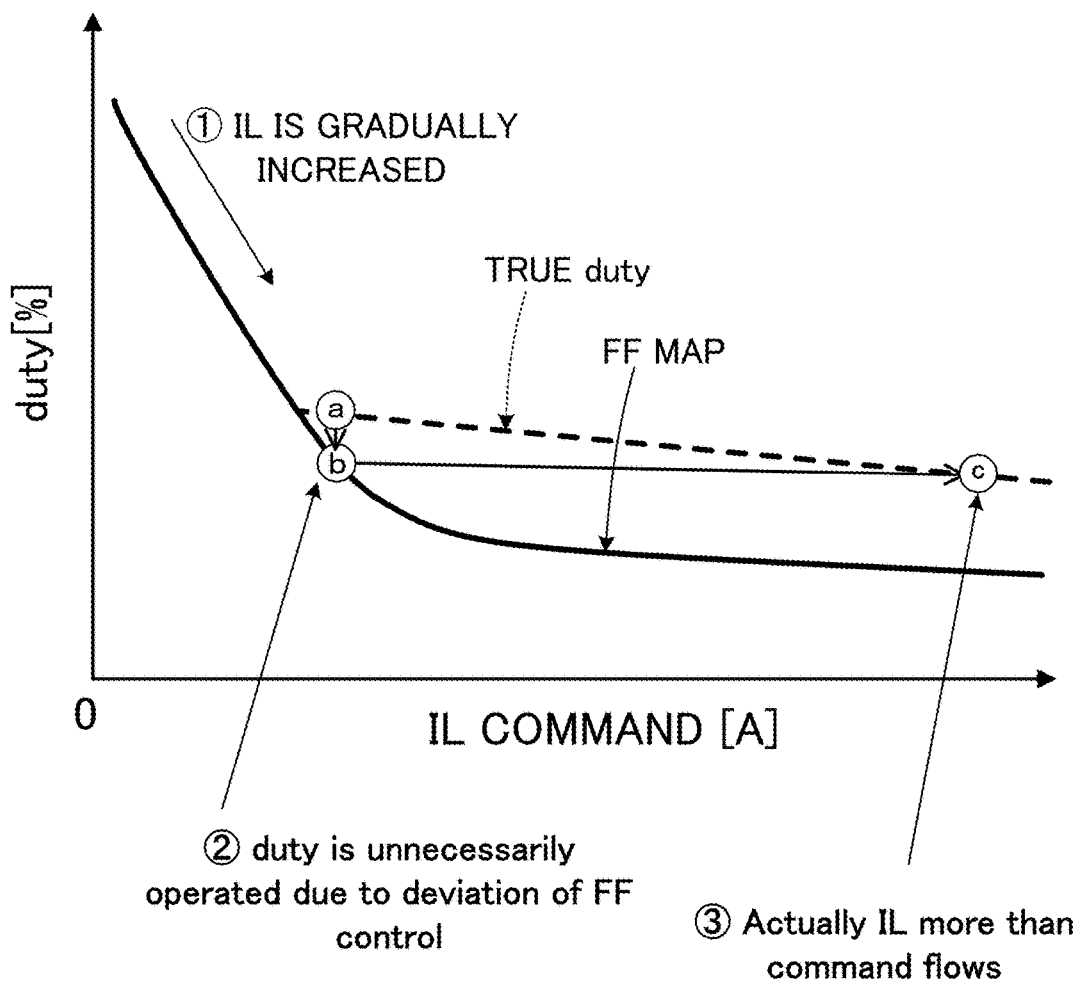
FIG. 8 is a graph illustrating a problem caused by deviation of feed-forward control.

Next, a problem that can occur when the reactor current IL is near zero will be explained with reference to FIG. 6 to FIG. 8. FIG. 6 is a graph illustrating a relation between duty and the reactor current during zero crossing. FIG. 7 is a graph illustrating a simulation result of the reactor current according to the comparative example. FIG. 8 is a graph illustrating a problem caused by deviation of feed-forward control.

As illustrated in FIG. 6, during non-zero crossing, the relation between the duty and the reactor current IL is linear. During zero crossing, however, the reactor current IL cannot change across zero, and the relation between the duty and the reactor current IL is thus not linear. As described above, the relation between the duty and the reactor current IL significantly changes depending on whether or not the reactor current IL is near zero.

As illustrated in FIG. 7, if the same control is performed during zero crossing and during non-zero crossing, the actual reactor current IL is greatly disturbed with respect to a command value of the reactor current IL. In other words, if the control is performed without considering whether or not the reactor current IL is near zero, there can be such a problem that a desired reactor current IL cannot be obtained.

If feed-forward control and feedback control are performed when the duty is controlled, there is a possibility that the aforementioned disadvantage can be avoided. However, the feed-forward control easily uses variable parameters such as, for example, inductance of the reactor L1 and internal resistance of the power storage apparatus 28, deviation highly likely occurs. Therefore, even the use of the feed-forward control and the feedback control does not necessarily provide the desired reactor current IL all the time.

As illustrated in FIG. 8, it is assumed that control at a point a is currently desired in a situation in which the reactor current IL is gradually increased. If, however, there is deviation of the feed-forward control, control at a point b is performed. In other words, control is performed in such a manner that the duty is smaller than an appropriate value. In this case, it is regarded as control at a point c corresponding to true duty, and the reactor current IL to be outputted is extremely high. As described above, if the reactor current IL is outputted as an unnecessarily large value, for example, there can be damage in a PCU or the like. In other words, if the desired reactor current IL is not obtained, there is a possibility of an unexpected disadvantage.

The boost control apparatus according to the embodiment is configured to perform a duty control switching operation explained below, in order to avoid the aforementioned disadvantage.

<Duty Control Switching Operation>

Figure 9:
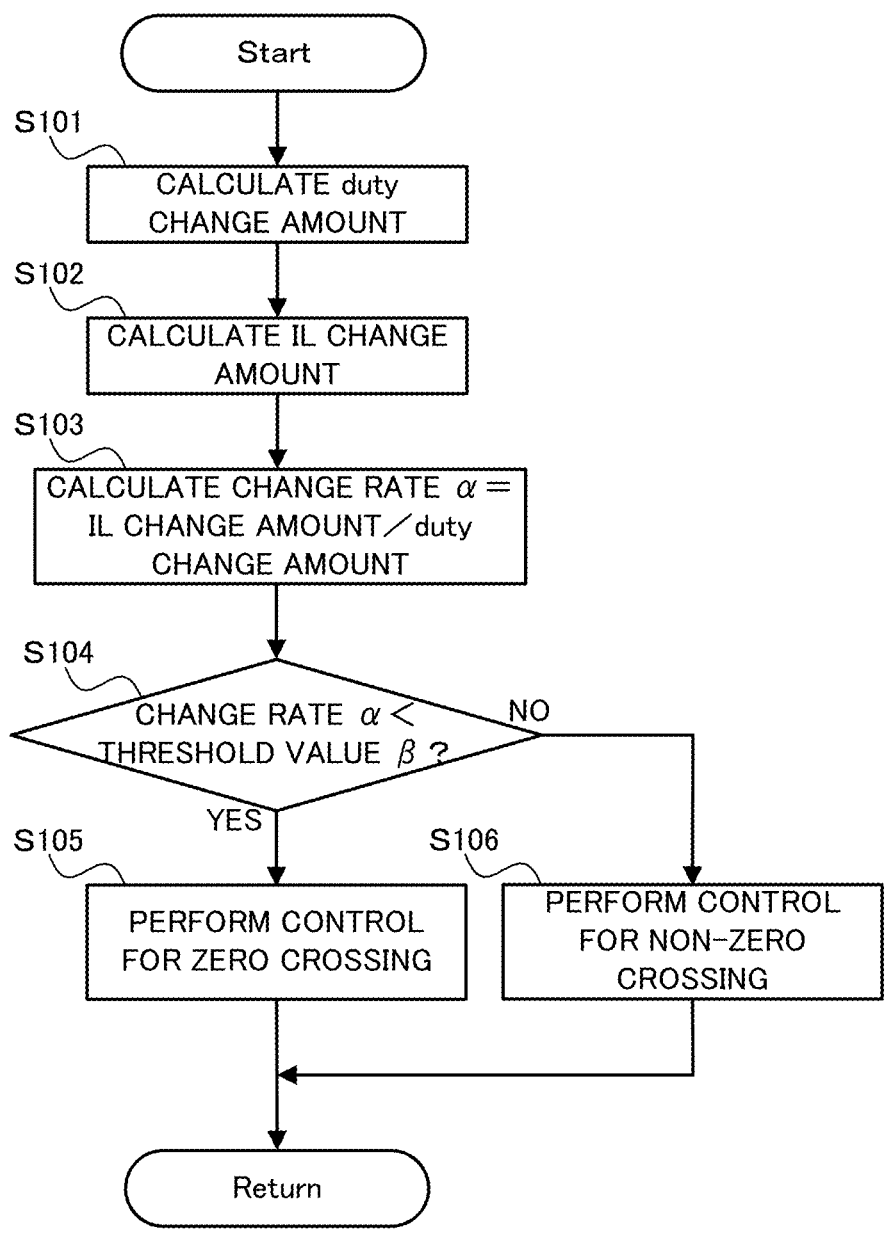
FIG. 9 is a flowchart illustrating a duty control switching operation according to the embodiment.
Figure 10:
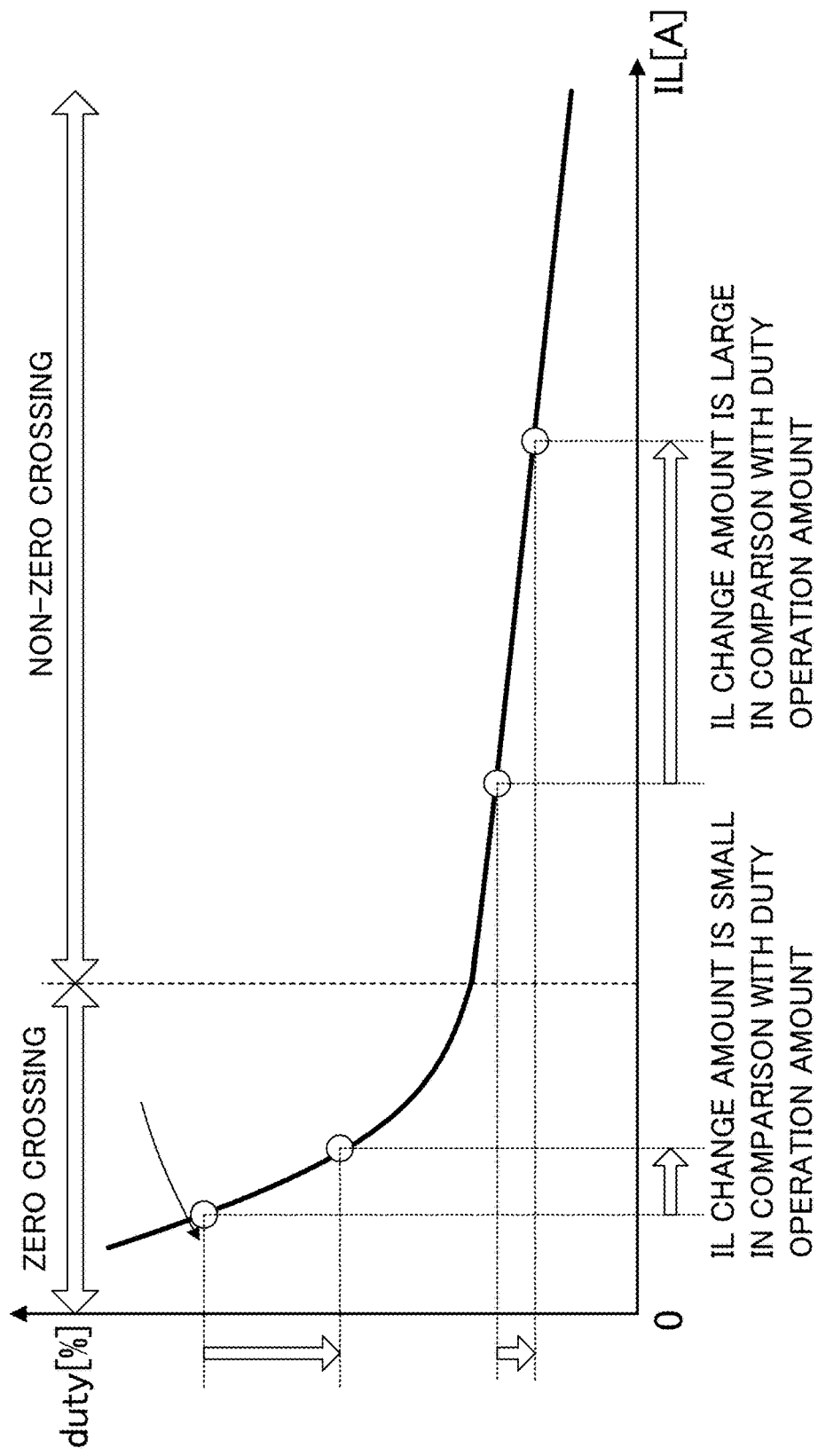
FIG. 10 is a graph illustrating a change rate of the reactor current to a duty change amount.

Hereinafter, a duty control switching operation performed by the ECU 30, which is one example of the boost control apparatus according to the embodiment, will be explained in detail with reference to FIG. 9 and FIG. 10. FIG. 9 is a flowchart illustrating the duty control switching operation according to the embodiment. FIG. 10 is a graph illustrating the change rate of the reactor current to the duty change amount.

In FIG. 9, in the duty control switching operation, the change rate calculation unit 310 firstly calculates the duty change amount in the duty control (step S101). Moreover, the change rate calculation unit 310 calculates a change amount of the reactor current IL in duty control (step S102). In other words, the change amount of the reactor current IL with respect to the duty change amount in the step S101 is calculated.

The change rate calculation unit 310 further calculates a change rate α of the reactor current IL to the duty change amount (step S103). The change rate α can be calculated by dividing the change amount of the reactor current IL calculated in the step S102 by the duty change amount calculated in the step S101.

As illustrated in FIG. 10, according to the study by the present inventors, it is found that the change rate of the reactor current IL to the duty change amount during zero crossing is less than that during non-zero crossing. Specifically, as is clear from the drawing, the reactor current IL only slightly changes even if a duty value is significantly changed during zero crossing; however, the reactor current IL significantly changes even if the duty is slightly changed during non-zero crossing. In the embodiment, it is determined whether or not it is the zero crossing by using this characteristic.

Back in FIG. 9, the zero crossing determination unit 320 determines whether or not the calculated change rate α is less than a predetermined threshold value ß (step S104). The threshold value ß is one example of the "predetermined value" according to the present invention, and an appropriate value may be set, for example, by actually measuring a change rate of the output current during zero crossing and a change rate of the output current during non-zero crossing.

If it is determined that the change rate α is less than the predetermined threshold value ß (the step S104: YES), it is determined that the reactor current IL is near zero, and duty control for zero crossing is performed (step S105). Specifically, feed-forward control using a feed-forward term (hereinafter referred to as a "FF term" as occasion demands) for zero crossing is performed by the duty control unit 330.

On the other hand, if it is determined that the change rate α is not less than the predetermined threshold value ß (the step S104: NO), it is determined that the reactor current IL is not near zero, and duty control for non-zero crossing is performed (step S106). Specifically, feed-forward control using a FF term for non-zero crossing is performed by the duty control unit 330.

As described above, if the duty control is determined according to the change rate of the reactor current IL, appropriate duty control can be performed, for example, even if a value of the reactor current IL cannot be accurately detected. Particularly in the one-side element control, the reactor current IL periodically goes up and down, and it is thus hard to determine the zero crossing directly from an output value of the current sensor or the like. In the embodiment, however, the zero crossing can be preferably determined by using the change rate of the reactor current IL. It is thus possible to switch the duty control according to the zero crossing at appropriate timing, thereby certainly obtaining the desired reactor current IL.

<Adjustment Process Upon Duty Control Switching>

Figure 11:
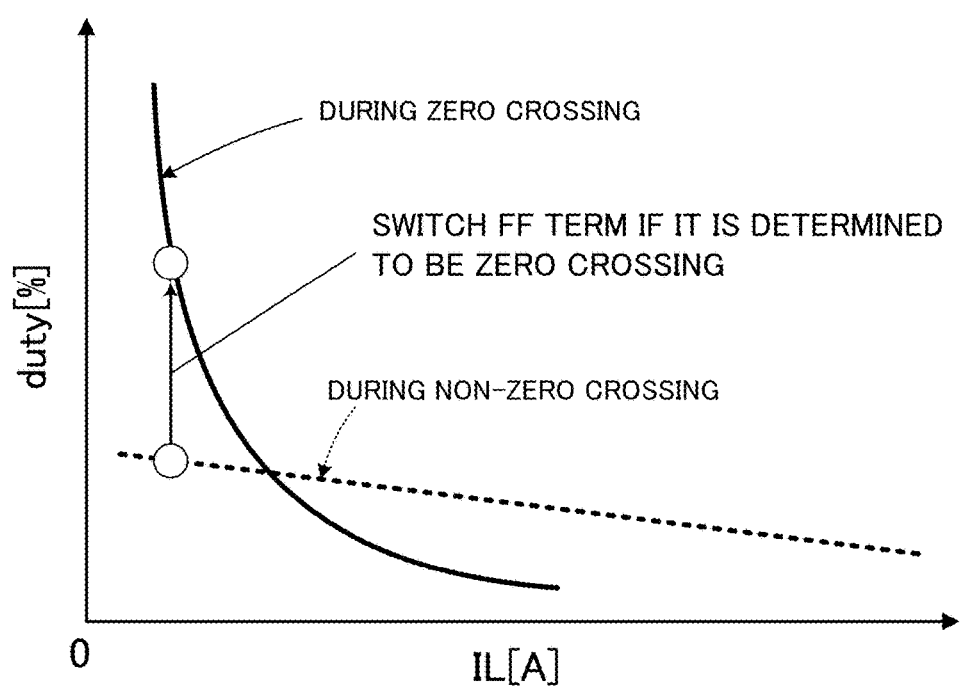
FIG. 11 is a graph illustrating a feed-forward term switching operation.
Figure 12:
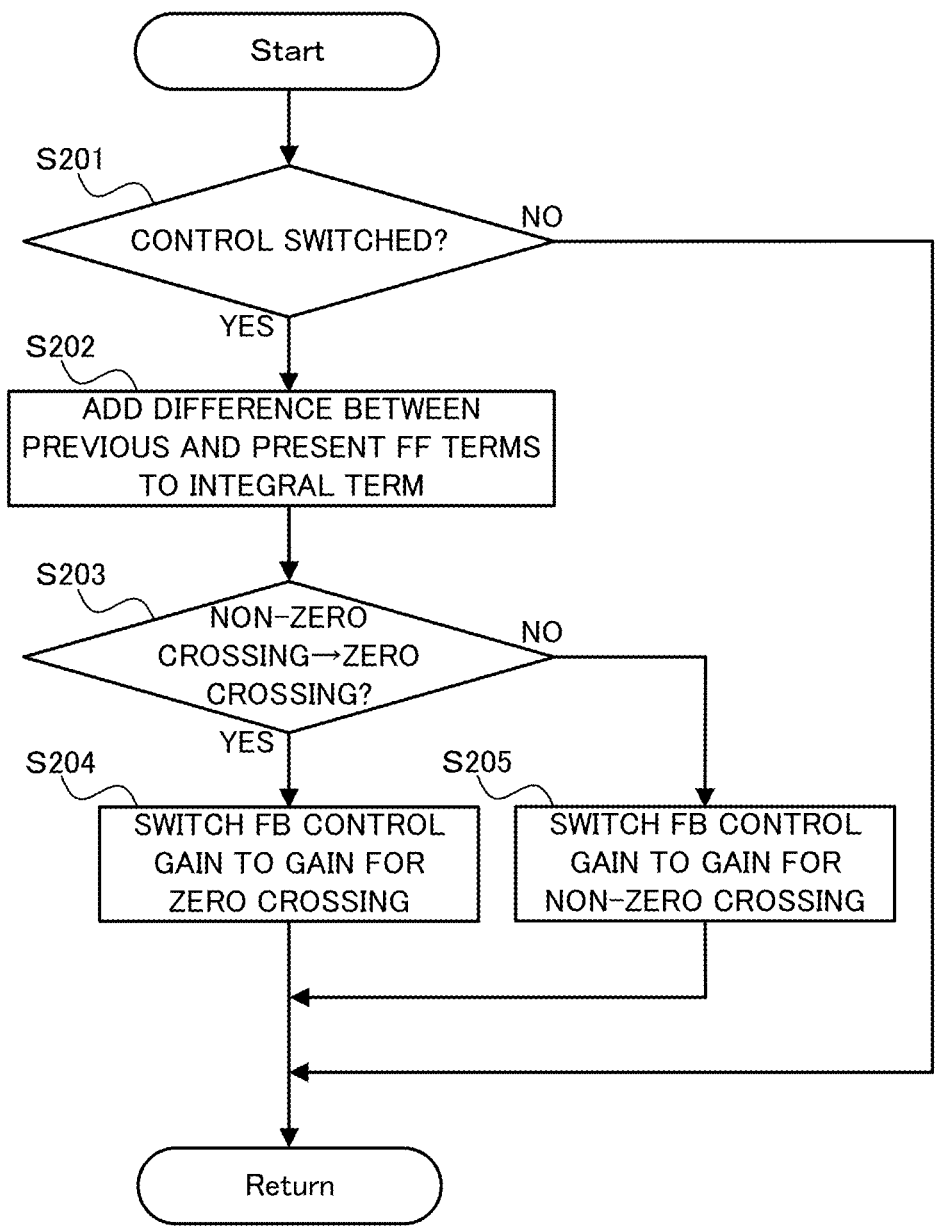
FIG. 12 is a flowchart illustrating an adjustment operation upon control switching.
Figure 13:
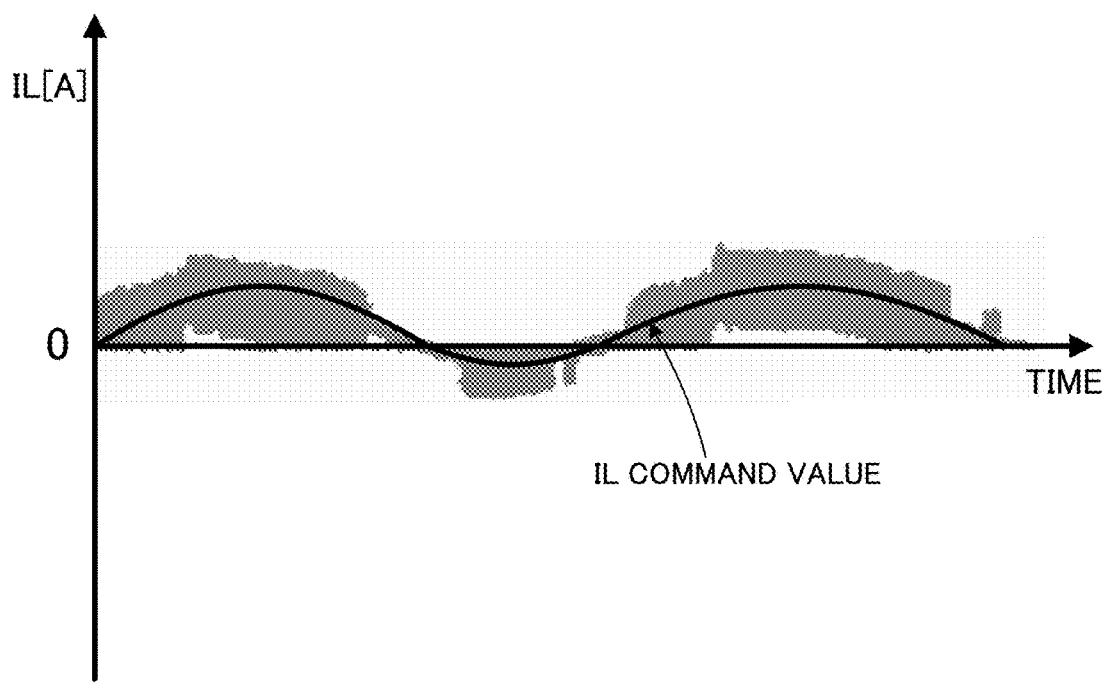
FIG. 13 is a graph illustrating a simulation result of the reactor current according to the embodiment.

Hereinafter, an adjustment process performed upon the aforementioned duty control switching will be explained with reference to FIG. 11 to FIG. 13. FIG. 11 is a graph illustrating a feed-forward term switching operation. FIG. 12 is a flowchart illustrating the adjustment operation upon control switching. FIG. 13 is a graph illustrating a simulation result of the reactor current according to the embodiment.

In FIG. 11, as already explained, if it is determined that the non-zero crossing is switched to the zero crossing, the FF term for non-zero crossing is switched to the FF term for zero crossing. At this time, the continuity of the FF term is lost before and after the switching, and thus, simply switching the FF term possibly causes a disadvantage. Therefore, in the embodiment, the adjustment process detailed below is performed if the duty control is switched.

In FIG. 12, if the duty control is switched according to a result of zero crossing determination (step S201: YES), a difference between a previous FF term and a present FF term is added to an integral term (step S202). This maintains the continuity before and after the duty control switching, by which the disadvantage can be avoided.

Moreover, if the duty control switching is from the control for non-zero crossing to the control for zero crossing (step S203: YES), a feedback gain is switched to a feedback gain for zero crossing. On the other hand, if the duty control switching is from the control for zero crossing to the control for non-zero crossing (step S203: NO), the feedback gain is switched to a feedback gain for non-zero crossing. This makes it possible to respond to a change in responsiveness caused by the duty control switching.

Specifically, a duty command when the control for non-zero crossing is continued is expressed by the following equation (1).

Duty command=FF term during non-zero crossing+ $kp1$×Current deviation+$ki1$×Current deviation+ Integral term    (1)

Each of $kp1$ and $ki1$ is a feedback gain during non-zero crossing, and for example, $kp1=0.01$, and $ki1=0.1$. Moreover, "$ki1$×Current deviation+Integral term" herein is an integral term in next control.

In contrast, a duty command when the control for non-zero crossing is switched to the control for zero crossing is expressed by the following equation (2).

Duty command=FF term during zero crossing+$kp2$×Current deviation+$ki2$×Current deviation+{Integral term+(FF term during non-zero crossing−FF term for zero crossing)} (2)

Each of kp2 and ki2 is the feedback gain during zero crossing, and for example, kp2=0.03, and ki2=0.3. Moreover, "$ki1$×Current deviation+Integral term" herein is an integral term in next control. Moreover, "$ki2$×Current deviation+{Integral term+(FF term during non-zero crossing−FF term for zero crossing)}" herein is the integral term in next control.

Moreover, a duty command when the control for zero crossing is continued is expressed by the following equation (3).

Duty command=FF term during zero crossing+$kp2$×Current deviation+$ki2$×Current deviation+Integral term (3)

"$ki2$×Current deviation+Integral term" herein is the integral term in next control.

In contrast, a duty command when the control for zero crossing is switched to the control for non-zero crossing is expressed by the following equation (4).

Duty command=FF term during non-zero crossing+$kp1$×Current deviation+$ki1$×Current deviation+{Integral term+(FF term during zero crossing−FF term for non-zero crossing)} (4)

"$ki1$×Current deviation+{Integral term+(FF term during zero crossing−FF term for non-zero crossing)}" herein is the integral term in next control.

As illustrated in FIG. 18, if the aforementioned duty control switching process and the adjustment process are performed, the disturbance of the reactor current IL as illustrated in FIG. 7 can be suppressed. In other words, a deviation between the command value of the reactor current IL and the actual reactor current IL can be reduced. To put it differently, if the different duty control is selectively performed according to whether or not it is the zero crossing, the desired reactor current IL can be certainly obtained even if the relation between the duty and the reactor current IL changes.

As explained above, according to the boost control apparatus in the embodiment, the zero cross can be accurately determined, and the duty control can be preferably performed.

The invention may be embodied in other specific forms without departing from the spirit or essential characteristics thereof. The present embodiments and examples are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A boost control apparatus that can realize one-side element control for driving only one of a first switching element and a second switching element, each of which is connected to a reactor in series, said boost control apparatus comprising:

a controlling device configured (i) to perform first duty control by a first control parameter if output current that flows through a reactor is not near zero, and (ii) to perform a second duty control by a second control parameter if the output current is near zero;

a rate calculating device configured to calculate a change rate of the output current to a change amount of a duty value in the first duty control and the second duty control; and a control determining device configured to control said controlling device to perform the second duty control regardless of the output current, if the change rate is less than a predetermined threshold such that even if the value of the output current is not near zero, the second duty control is performed during zero crossing if the calculated change rate of the output current is less than the predetermined threshold.

2. The boost control apparatus according to claim 1, wherein said control determining device is to control said controlling device to perform the first duty control regardless of the output current, if the change rate is not less than the predetermined threshold.

3. The boost control apparatus according to claim 1, wherein said controlling device is to perform control for increasing continuity of the first control parameter and the second control parameter when switching between the first duty control and the second duty control.

4. The boost control apparatus according to claim 3, wherein the first duty control and the second duty control include proportional integral control, and said controlling device is to add a difference between the first control parameter and the second control parameter to an integral term in the proportional integral control, thereby increasing the continuity of the first control parameter and the second control parameter.

5. The boost control apparatus according to claim 1, wherein the first duty control and the second duty control include feedback control, and said controlling device is to switch a gain of the feedback control when switching between the first duty control and the second duty control.

6. A boost control apparatus that can realize one-side element control for driving only one of a first switching element and a second switching element, each of which is connected to a reactor in series, said boost control apparatus comprising:

a controlling device configured (i) to perform first duty control by a first control parameter if output current that flows through a reactor is not near zero, and (ii) to perform a second duty control by a second control parameter if the output current is near zero;

a rate calculating device configured to calculate a change rate of the output current to a change amount of a duty value in the first duty control and the second duty control; and a control determining device configured to control said controlling device to perform the second duty control regardless of the output current, if the change rate is less than a predetermined threshold such that even if the value of the output current is not near zero, the second duty control is performed during zero crossing.

7. The boost control apparatus according to claim 6, wherein said control determining device is to control said controlling device to perform the first duty control regardless of the output current, if the change rate is not less than the predetermined threshold.

8. The boost control apparatus according to claim 6, wherein said controlling device is to perform control for increasing continuity of the first control parameter and the second control parameter when switching between the first duty control and the second duty control.

9. The boost control apparatus according to claim 8, wherein the first duty control and the second duty control include proportional integral control, and said controlling device is to add a difference between the first control parameter and the second control parameter to an integral term in the proportional integral control, thereby increasing the continuity of the first control parameter and the second control parameter.

10. The boost control apparatus according to claim 6, wherein the first duty control and the second duty control include feedback control, and said controlling device is to switch a gain of the feedback control when switching between the first duty control and the second duty control.

\* \* \* \* \*